Sept. 3, 1929.  A. A. KRAMER  1,727,207
TANK VEHICLE
Filed Jan. 21, 1925   2 Sheets-Sheet 1
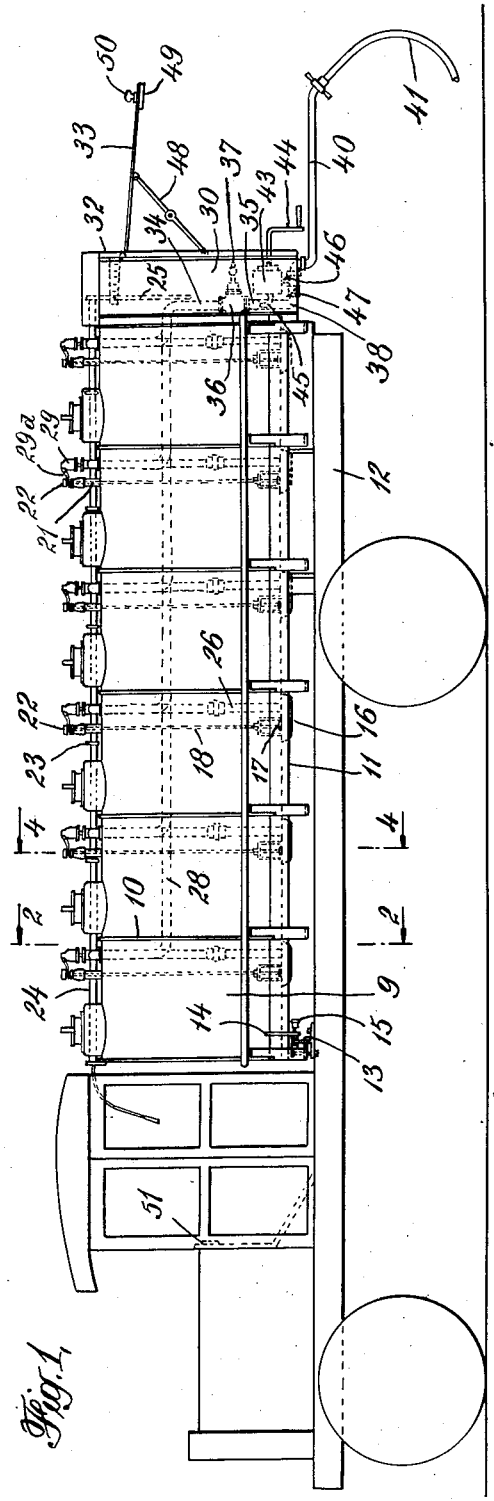
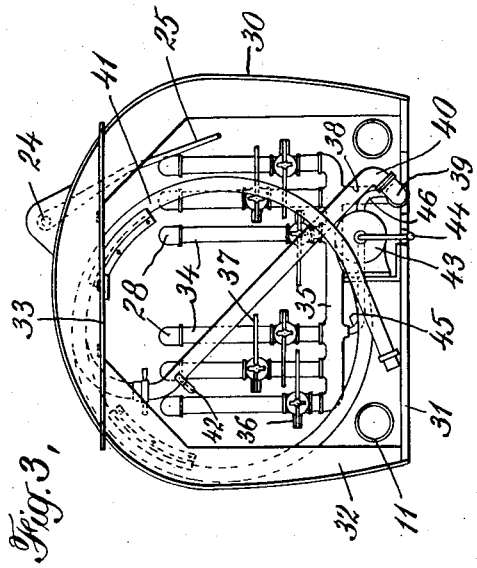
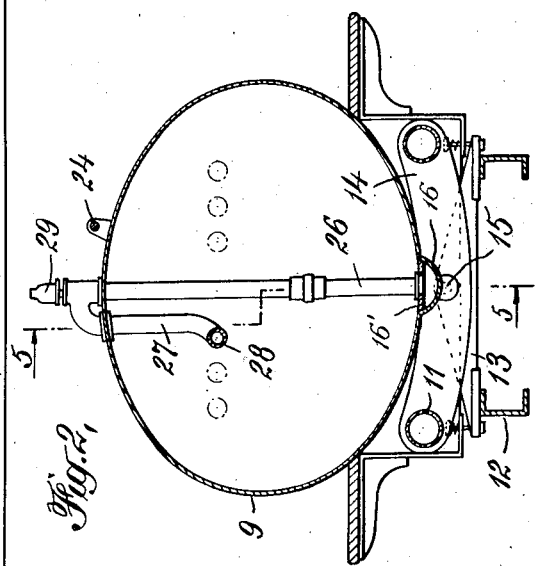
INVENTOR

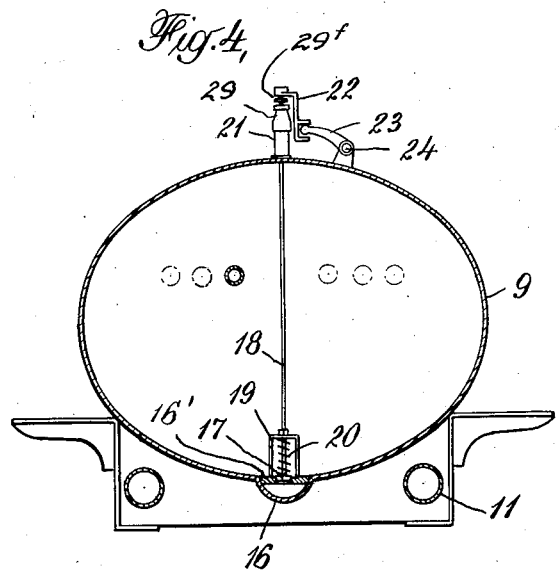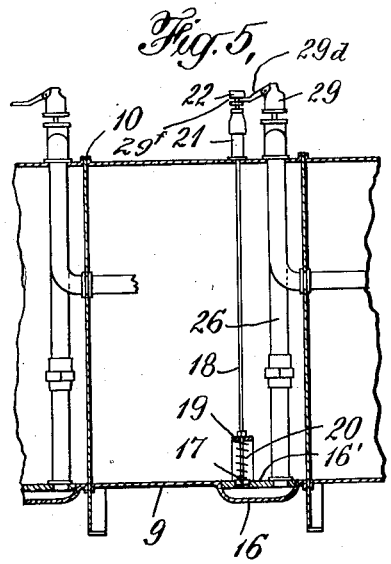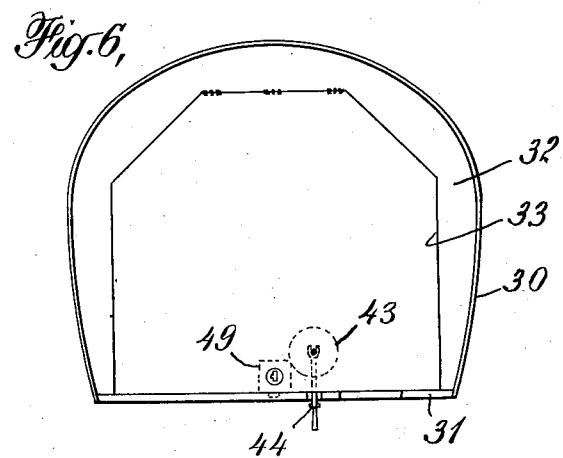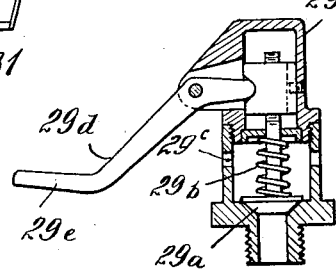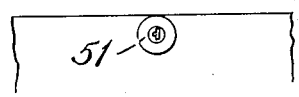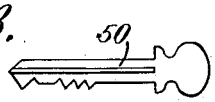

Patented Sept. 3, 1929.

1,727,207

UNITED STATES PATENT OFFICE.

ANDREW A. KRAMER, OF KANSAS CITY, MISSOURI.

TANK VEHICLE.

Application filed January 21, 1925. Serial No. 3,776.

This invention relates to vehicles for conveying and dispensing liquids and has reference more particularly to self-propelled vehicles having tank bodies for use in conveying and dispensing liquid fuels such as gasoline.

The invention is directed to the provision of various improvements in the construction of tank cars for this use, all relating to increasing the safety against accident due to explosion or fire resulting from leakage of the fuel.

In the construction and methods of use of tank cars for distributing volatile fuels such as gasoline, particularly in large cities, it is of the highest degree of importance that every precaution against accident be observed and every provision to that end made to prevent carelessness and oversight of operators from making such an accident possible.

This invention involves the provision of an improved construction whereby a greater degree of security against accident is obtained than with those heretofore employed.

In tank cars for dispensing gasoline it has been common heretofore, in minimizing the danger element, to subdivide the tank body into a plurality of compartments and provide pipes running from these several compartments back to the rear where they are provided with faucets for use in drawing off the liquid. In accordance with the improved construction forming the subject matter of this invention, the fuel is not permitted to flow out freely from the tank on merely opening a faucet at the outlet end of the pipe leading from the tank. Instead, the tank or each compartment of the tank is provided with a pipe system constituting a siphon, such that when it is desired to draw off the liquid fuel, it is not only necessary for the operator to open a faucet at the end of the outlet pipe, but also to cause the pipe to be filled in order to initiate the siphon action.

In accordance with the preferred embodiment of the invention, the compartment construction heretofore referred to is employed and there is a siphon pipe extending from each compartment back to the rear of the vehicle where the several pipes are connected to a manifold; and a rotary, manually operated pump is employed for drawing liquid from any compartment into the pipe leading from that compartment so as to fill the pipe and cause the outflow of the liquid by siphon action. The pump may be connected to the manifold so that it may be used in conjunction with any selected one of the tank compartments and it is preferably connected in a by-pass around a portion of the outlet pipe, so that as soon as the outflow of the fuel has been started, the operation of the pump may be discontinued and the flow will continue. In this way all danger of leakage due to damage to one of the faucets at the rear of the vehicle or one of the pipes in which the faucets are connected resulting from a collision or any other cause and the possibility of fire or explosion resulting therefrom is eliminated.

In the operation of such tank cars propelled by internal combustion engines, it is of great importance, as a measure of protection against possible accident, that the operation of the propelling motor should be discontinued before the drawing off of the liquid fuel from the tank begins and it should be maintained inoperative throughout the entire period during which the drawing off of the liquid and the manipulation of the devices incident to doing so continues. Also, it is important as a further measure of protection that means be provided for insuring that the door closing the compartment at the rear of the vehicle in which the faucets and other controlling devices are mounted be closed and locked closed while the vehicle is in motion. One feature of the present invention involves the employment of a simple expedient for insuring the attainment of these very desirable ends. The door referred to at the rear of the vehicle is provided with a key-controlled lock for locking it in the closed position and the ignition system of the propelling motor of the vehicle is under the control of a key-controlled switch in a manner heretofore common in automobile construction. In accordance with this invention a single key operates or controls the ignition switch and also operates the lock of the door of the compartment at the rear of the vehicle and these parts are so constructed that the key can only be taken out of the lock of that door when the lock is in the locking position and can only be taken out of the ignition switch when the switch is in the "off" position for rendering the propelling motor of the vehicle inoperative. Thus, when the operator stops the vehicle at a station where liquid fuel is to be supplied, he must discontinue the operation of the propelling motor in order to take the key out of the ignition switch for use in opening the door of the compartment at the rear of the vehicle. Also, when he has finished dispensing fuel at that station he must lock the door of that compartment in order to withdraw the key from the lock for use in operating the ignition switch to permit him to start the propelling motor in operation.

These and other features of the invention will be better understood by reference to the following description in connection with the drawings which show the preferred embodiment of the invention. In these drawings, Fig. 1 is a side elevation of a tank car constructed in accordance with the invention; Fig. 2 is a transverse section on line 2—2 of Fig. 1; Fig. 3 is a view of the rear end of the vehicle with the door of the compartment open; Fig. 4 is a transverse section on line 4—4 of Fig. 1; Fig. 5 is a partial longitudinal section on line 5—5 of Fig. 2; Fig. 6 is a view of the rear end of the vehicle with the door closed; Fig. 7 is a view of a portion of the dash of the vehicle; Fig. 8 is a view of a key to indicate on the drawings the key control system above referred to; and Fig. 9 is a detail view of the vacuum break valve.

Referring to these drawings, Fig. 1 shows a self-propelled vehicle of the usual type having a tank mounted thereon, this tank being of oval cross-section as indicated in Fig. 2 and made of sheet metal. The tank 9 is subdivided into a plurality of relatively small compartments by vertical partitions 10 made of sheet metal. These partitions 10 are extended below the bottom wall of the tank and pipes 11 extending lengthwise of the tank pass through openings in these extensions of the partitions and are rigidly secured thereto to form longitudinal braces strengthening the structure of the tank as a whole. The tank body is mounted upon the vehicle in any suitable manner but that which I prefer to employ is the so-called "three-point suspension" described in patents heretofore granted to me. To that end the rear portion of the tank is mounted in any suitable manner upon the rear ends of the lengthwise sills 12 of the frame of the vehicle and the forward end of the tank is pivotally mounted at the center of a transverse bolster 13 extending across between the sills 12. The transverse bolster 14 is secured at its ends to pipes 11 near their forward ends and a pivot pin 15 extends through this bolster 14 and a central opening in the transverse bolster 13.

Each of the several compartments of the tank body is provided with a depression or sump 16 formed in the bottom of the tank. A plate 16' is welded in place over the sump and is provided with an opening controlled by a valve 17. The valve is mounted upon a rod 18 extending vertically across the tank compartment and guided at its lower end by an opening in a frame 19. A spring 20 is coiled around the rod 18 between the valve 17 and the top of the frame 19 and tends always to force the valve to the closed position. At its upper end the rod 18 passes through a guide 21 secured upon the top wall of the tank compartment and on its upper end is a crank arm 22 with which parts 23 mounted on a lengthwise rod 24 co-operate; the rod 24 extends to the rear of the vehicle and is provided with an operating handle 25 by the manipulation of which the valve 17 of any selected compartment may be moved to the open position against the tension of its spring 20. The construction and operation of the gearing for opening and closing any selected valve by manipulation of the handle 25 at the rear of the vehicle need not be described in detail as it forms the subject matter of application Serial Number 707,409 for patent filed April 18, 1924, and assigned to me.

Each plate 16' is also provided with a second opening and a pipe 26 leads from that opening upwardly across the full height of the tank and out through an opening in the top wall of the tank. Above the top wall of the tank this pipe leads into a branch 27 extending downwardly through another opening in the top wall of the tank and inside of the tank this branch is directed horizontally as shown at 28 and passes back through all of the partitions 10 to the rear of the vehicle. Fig. 2 shows this piping arrangement for the forward compartment and the dotted circles thereon indicate the positions of the horizontal pipes 28 to the other compartments.

At the upper end of the pipe 26 a vacuum break valve 29 is provided the purpose of which is to admit air into the apex of the syphon formed by the pipes 26, 27 and 28, breaking the action of the siphon when valve 17 is closed. The valve 29 is shown in detail in Fig. 9. It comprises a suitable casing containing a valve proper $29^a$ normally held seated by a spring $29^b$. When the valve is opened air is admitted through openings $29^c$ to the space at the apex of the siphon. The valve is actuated by a pivoted arm $29^d$ having a forked extremity $29^e$. The arrangement is such that when the forked extremity $29^e$ is depressed the valve $29^a$ is lifted against the action of the spring $29^b$. When the forked extremity $29^e$ is permitted to rise, the spring $29^b$ seats the valve $29^a$. The forked extremity $29^e$ engages in a suitable recess $29^f$ formed on the valve rod 18. Therefore, when the valve 17 is closed the arm $29^d$ will be so actuated as to open the valve $29^a$. Conversely when the valve 17 is open the arm $29^d$ will be actuated to close the valve $29^a$. It will, therefore, be seen that the valves 17 and $29^a$ are so interconnected that when one is open the other is closed.

At the rear of the vehicle the horizontal pipes 28, six of them in this instance, pass through the rear wall of the tank and into a closet or compartment formed by a hood 30 conforming generally to the shape of the tank, a bottom wall 31, a rear wall 32 having a large opening therein and a door 33 hinged to the wall 32 at the top of the door opening therein.

The rear ends of the several pipes 28 are connected to pipes 34 extending vertically downward and connected at their lower ends to a horizontally disposed manifold 35 and in each of these vertically disposed lengths of piping 34 is a manually operated faucet 36. The handles 37 of these faucets are so constructed and arranged that when they are moved to the position for opening their respective faucets they extend out beyond the plane of the door 33 when the latter is in its closed position. As a result, the door 33 cannot be closed while a faucet 36 is open but instead the faucet must be closed before the door is closed or will be closed by the door when the latter is closed.

From the manifold 35 a short length of piping 38 extends vertically downward and rearward and to this a pipe elbow 39 is connected in such manner as to permit these two parts to be turned relatively about a horizontal axis. The elbow 39 is connected to a length of piping 40 in such a manner that these two parts also may be turned relatively as desired. The other end of the pipe 40 is connected to a flexible hose 41. These parts may be stowed within the compartment 30 when not in use by turning the length of hose 41 about a horizontal axis to carry it to the position in which it is shown in Fig. 3 in which the pipe 40 bears upon a support 42 and the flexible hose 41 is coiled within the compartment as shown in Fig. 3. When preparing to withdraw fuel from the tank, the flexible hose 41 is taken out from the compartment and then the length of piping 40 is swung around about a horizontal axis and also turned about a vertical axis to bring the parts to the positions in which they are indicated in Fig. 1.

The pump 43 is mounted within the compartment 30 and provided with a crank handle 44 for actuating it. The suction end of this pump is connected by a pipe 45 to the manifold 35 and the discharge end is connected by a pipe 46 to the branch pipe 38 leading from the manifold 35. In this branch pipe 38 is a check valve 47 as shown in Fig. 1.

When it is desired to discharge liquid fuel from one of the tank compartments to a receptacle, the hose connection 40, 41 is moved out from the Fig. 3 position to the Fig. 1 position and the end of the hose is placed in or connected to the receptacle to be filled. Then the operator manipulates the valve mechanism 24 by means of the handle 25 so as to open the valve 17 of the tank compartment from which the fuel is to be withdrawn. Next he turns the handle 44 of the pump 43 so as to operate the pump to create a suction back through the pipe 45, manifold 35, and pipes 34, 28, 27 and 26 leading to the compartment whose valve 17 is open. At this time the check valve 47 closes automatically. The suction thus produced draws the liquid from the selected tank compartment through the pipes 26, 27, 28 and 34 into the manifold 35 and through the inlet pipe 45 and the discharge pipe 46 of the pump to the pipe 38 and hose 41, and when the flow has been established in this way, operation of the pump is discontinued and thereupon the flow of the liquid is continued by a siphon action, the liquid flowing from the manifold 35 through pipe 38 to the pipe 40 instead of through the pump. The flow will continue until the tank compartment is emptied or until the flow is intentionally discontinued by closing the valve 36 in the supply pipe manually by its operating lever 37 or by closing the valve 17.

As stated above, the handles 37 of the faucets 36 when in the open position project out beyond the plane of the door 33 when the latter is in its closed position. Similarly, the arrangement of the handle 25 or some other part associated with the mechanism for opening and closing the several valves 17 may be such that when any valve is open this handle projects out through the doorway of the door 33, precluding closing the door until the handle has been moved to its closed position. Also, the connection from this handle 25 to the parts actuated by it may include a fusible link and also the support 48 for holding the door 33 open may also be provided with a fusible link such that a fire at the rear end of the vehicle would result in release of the mechanism controlled by the handle 25 and movement of that mechanism to the position for closing the valves 17 and also closure of the door 33. The construction in these respects forms no part of the present invention but is described in detail in application Serial Number 707,409 previously referred to.

Due to the fact that the valve 29ª is open when the valve 17 is closed the action of the siphon will be broken whenever the valve 17 is closed. This insures the siphon pipe being emptied after drawing off a portion of the contents of one of the tank compartments, and in case of fire the door 33 dropping automatically and closing the valve 17 will also open valve 29ª and permit the siphon to drain.

The handle 44 of the pump 43 when in its operative position as shown in Fig. 1 projects through the doorway of the compartment 30 at the rear of the vehicle and in this position precludes closing of the door 33. This handle is hinged and made collapsible as shown in Figs. 1 and 6 so that it will recede when the door 33 falls and closes. This is to permit the fire protection apparatus to function by allowing the door 33 to close.

The door 33 is provided with a lock 49 controlled by a key 50 for locking the door in its closed position. The lock 49 is of such construction that the key 50 can be withdrawn from the lock only when the latter is in the locking position. This key 50 also controls the ignition switch of the motor driving the vehicle. The switch is shown at 51. It is key-actuated as is common in automobile construction and the key can be withdrawn from the switch only when the ignition circuits are opened. This makes it necessary for the operator of the vehicle to discontinue the operation of the propelling motor in order to remove the key 50 from the ignition switch 51 and thus have the key available for opening the door 33 of the operating compartment at the rear of the vehicle. Also, when the operator has completed the operation of withdrawing liquid from a tank compartment and desires to start the propelling motor of the vehicle, he must withdraw the key 50 from the lock 49 to have it available for turning the ignition switch and he can do so only after turning the lock 40 to its locking position.

I claim:

1. A vehicle having a tank mounted thereon, a plurality of vertical partitions dividing the tank into a plurality of tank compartments, a plurality of pipes each extending from the interior of a tank compartment to a point above the normal liquid level in the compartments, an outlet manifold at one end of the tank below said level and having an outlet below the bottom of the tank, the pipes being individually connected to said manifold, and means for controlling said pipes whereby liquid may be withdrawn from any selected compartment through the corresponding pipe by siphon action.

2. A vehicle having a tank mounted thereon, partitions dividing the tank into a plurality of tank compartments, a plurality of pipes each extending from a point within one of the compartments to a point above the normal liquid level in the compartments, a manifold disposed at one end and below the top of the tank and to which all of said pipes are individually connected, a valve in each pipe and a discharge pipe leading from the manifold to a point below the bottom of the tank whereby liquid may be discharged from any tank compartment through the corresponding pipe and the manifold by siphon action.

3. A vehicle having a tank mounted thereon and divided into a plurality of compartments, a pipe extending from within each compartment to a point above the normal liquid level in the compartment, a manifold at one end of the tank to which the pipes are connected, an outlet from the manifold at a point below the bottom of the tank, selectively operable means for controlling flow through the pipes, and a pump connected to the manifold for initiating flow from any selected compartment through the pipe leading therefrom whereby the flow may be continued by siphon action.

4. A vehicle having a tank mounted thereon, a plurality of transverse partitions dividing the tank into a plurality of compartments, a plurality of pipes each extending from the bottom of a compartment upwardly through the compartment to a point above the normal liquid level therein and then downwardly into the compartment and then lengthwise of the tank through the partitions thereof to the rear of the tank, a valve in each pipe at the rear of the tank, a manifold at the rear of the tank to which all of the pipes are connected and a discharge outlet from the manifold extending to a point below the bottom of the tank whereby liquid can be discharged from any tank compartment through the pipe of that compartment and the manifold and outlet by siphon action.

5. A vehicle having a tank mounted thereon, a plurality of transverse partitions dividing the tank into a plurality of compartments, a plurality of pipes each extending from the bottom of a compartment upwardly through the compartment to a point above the normal liquid level therein and then downwardly into the compartment and then lengthwise of the tank through the partitions thereof to the rear of the tank, a valve in each pipe at the rear of the tank, a manifold at the rear of the tank to which all of the pipes are connected, a discharge outlet from the manifold extending to a point below the bottom of the tank and a pump connected to the manifold for initiating flow from any selected tank compartment through its pipe and the manifold to the discharge outlet whereupon the flow may be continued by siphon action.

6. A vehicle having a tank mounted thereon, a plurality of partitions dividing the tank into a plurality of compartments, a rear compartment at the rear of the tank, a manifold mounted therein, pipe connections from the several tank compartments to the manifold, valves in said pipe connections and an outlet pipe pivotally connected to the manifold and adapted to be swung about its pivot to an inoperative position lying within the said rear compartment and to an operative or discharge position projecting outwardly from the said rear compartment.

7. A vehicle having a tank mounted thereon, a plurality of partitions dividing the tank into a plurality of compartments, a rear compartment at the rear of the tank, a manifold located therein, a plurality of pipes connected to the manifold and each extending to the interior of one of the tank compartments, a valve in each of said pipes, a handle for operating each valve and a door for the said rear compartment, the handle of each of said valves projecting through the doorway of the said door when the handle is moved to open the valve.

8. A vehicle having a tank mounted thereon this tank having a plurality of compartments, a pipe extending from within each compartment of the tank to a point above the normal liquid level in the compartment and then to a point below the bottom of the compartment, a compartment at the rear of the tank, a pump mounted within the rear compartment and connected to the pipes and adapted to be actuated to initiate flow from the tank out through the pipes, whereupon the flow will be continued by siphon action, and selectively operable means for breaking the siphon in any pipe.

9. A vehicle having a tank mounted thereon, partitions dividing the tank into a plurality of tank compartments, a rear compartment at the rear of the tank, a plurality of pipes each extending from a point within one of the compartments to a point above the normal liquid level in the tank and then to the interior of said rear compartment, an outlet pipe to which all of the said pipes are connected and a pump located in the rear compartment and connected to the said pipes and adapted to be actuated to initiate flow from any tank compartment out through the pipe thereof to the said outlet pipe whereupon the flow will be continued by siphon action.

10. A vehicle having a tank mounted thereon, a pipe connection extending from within the tank up to a point above the normal liquid level in the tank and then down to a discharge outlet located below the bottom of the tank, means for controlling said pipe whereby the contents of the tank may be discharged therefrom by a siphon action, and means for admitting air to the siphon located adjacent the controlling means whereby draining of the siphon may be effected after the controlling means is actuated to stop the siphon action.

11. A vehicle having a tank mounted thereon, a pipe connection extending from within the tank up to a point above the top of the tank and then down to a discharge outlet located below the bottom of the tank, a valve controlling the inlet end of said pipe, a second valve located near said point above the top of the tank for admitting air to the pipe, and connecting means between the valves whereby when one of the valves is open the other is closed.

12. A vehicle having a tank mounted thereon, a compartment located at the rear of said tank, a pump located in said compartment for pumping the contents of the tank to a discharge point, hand actuated means for operating the pump, and a door for said compartment, said hand actuated means projecting through the doorway of said door and being collapsible to permit closing of the door.

13. A device for holding and dispensing liquids comprising a tank, a conduit for discharging the liquids from the tank and said conduit constituting a siphoning system, valve means for controlling the flow of liquid from said tank through the conduit, and valve means in the apex of the siphon formed by the conduit, said valve means for controlling the flow and said valve means in the apex of the siphon being operatively connected whereby when one valve is in open position the other valve is in closed position.

14. The combination of a tank subdivided by partitions to form a plurality of compartments, a pipe in each compartment leading from a point near the bottom thereof to a point above the normal liquid level therein, an outlet common to all the pipes and below the bottom of the tank, a valve in each compartment for controlling flow through the intake end of the pipe therein, a pump for initiating siphonic flow through the pipes and selective means for controlling said valves.

15. The combination of a tank subdivided by partitions to form a plurality of compartments, a pipe in each compartment leading from a point near the bottom thereof to a point above the normal liquid level therein, a manifold at one end of the tank connected to the pipes, a valve in each compartment for controlling flow therefrom into the pipe in said compartment, a pump connected to the manifold for initiating siphonic flow through the pipes, and selective means for controlling said valves.

16. The combination of a tank subdivided by partitions to form a plurality of compartments, a pipe in each compartment leading from a point near the bottom thereof to a point above the normal liquid level therein, a pump connected to all the pipes for initiating siphonic flow therethrough, a valve in each compartment for controlling flow therefrom into the pipe therein, and selective means for controlling said valves.

17. The combination of a tank subdivided by partitions to form a plurality of compartments, a pipe in each compartment leading from a point near the bottom thereof to a point above the normal liquid level therein, means at the high point of each pipe for admitting air thereto, a valve in each compartment for controlling flow into the pipe therein, an operative connection between each valve and its associated air admitting means, a pump connected to all the pipes for initiating siphonic flow therethrough, and selective means for controlling said air admitting means individually and the valves associated therewith.

18. The combination of a tank sub-divided by partitions to form a plurality of compartments, each compartment having a covered sump at its bottom, a pipe in each compartment leading from a point within the sump to one end of the tank, a valve in each compartment controlling an inlet into the sump from the compartment, means for causing flow through the pipes, and selective means for controlling said valves.

19. The combination of a tank comprising a plurality of separate compartments, each compartment having a covered sump, a pipe in each compartment leading from the interior of the sump to a point above the normal liquid level in the compartment and thence to a point below the bottom of the compartment, a valve in each compartment controlling flow from the compartment into the sump, means for initiating siphonic flow through said pipes, and means for operating said valves selectively.

In testimony whereof I affix my signature.

ANDREW A. KRAMER.